United States Patent Office 3,521,543
Patented July 21, 1970

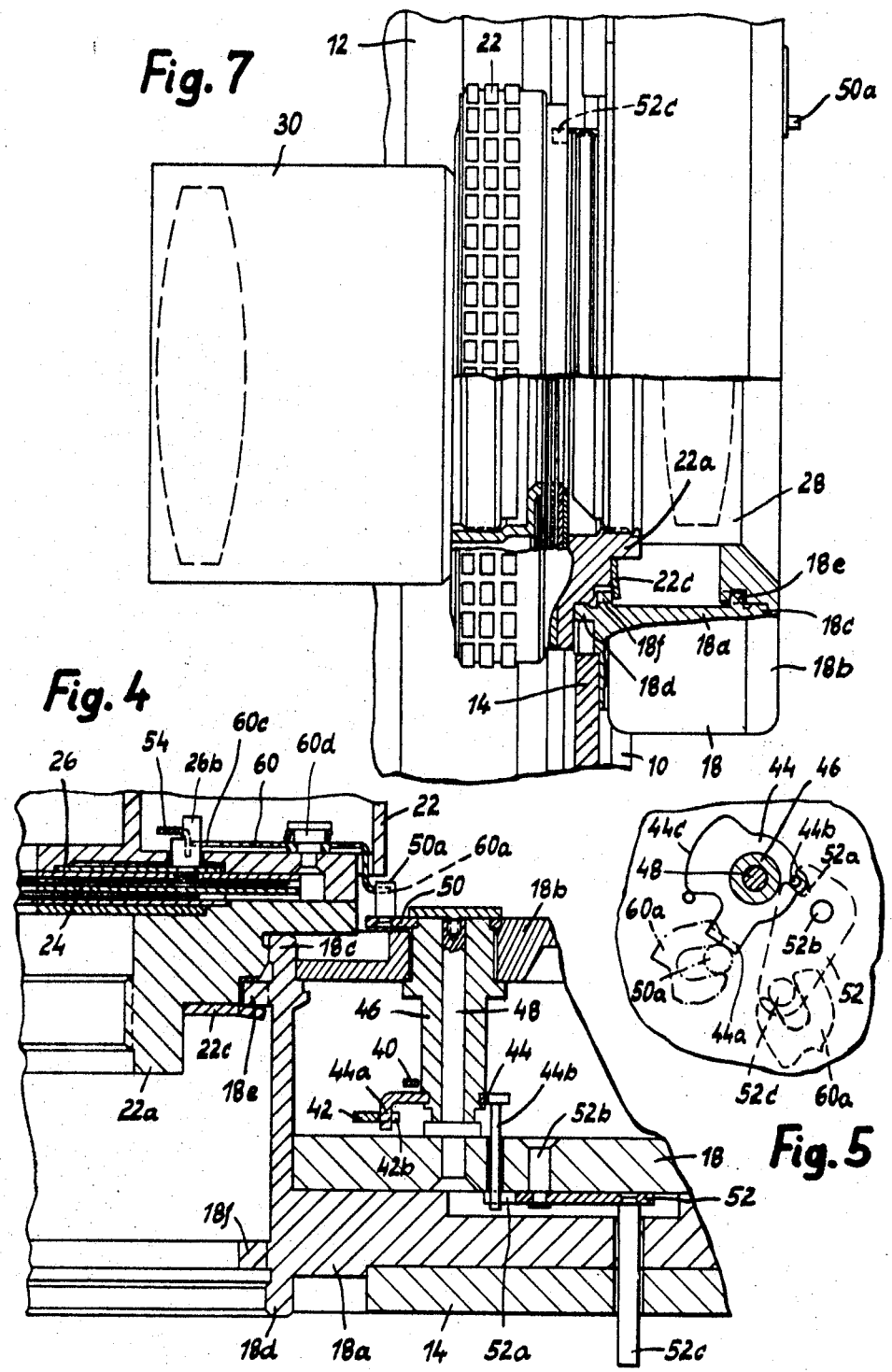

3,521,543
PHOTOGRAPHIC CAMERA
Franz Singer, Munich, Germany, assignor to Compur-Werk Gesellschaft mit beschrankter Haftung & Co., Munich, Germany, a firm of Germany
Filed July 21, 1967, Ser. No. 655,230
Int. Cl. G03b 9/00
U.S. Cl. 95—53         12 Claims

ABSTRACT OF THE DISCLOSURE

A camera having shutter operating and control mechanism in a housing which may be mounted to project either forwardly or rearwardly from a camera front plate member, and shutter blades in a second housing detachably mountable on either the front or rear of the first housing, and lens mounts detachably mountable on either front or rear of the second housing. The shutter blade mechanism of the second housing is automatically engaged with the driving parts in the first housing by the act of mounting the second housing on the first housing. The operating parts in the first housing are electrically controlled.

BACKGROUND OF THE INVENTION

In various types of photographic cameras, particularly those known as studio cameras, it is often desired to have the plane of the shutter blades at various axial distances from the focusing screen (usually a ground glass screen, or equivalent) at the back of the camera. This variation in distance is obtainable in the typical studio camera because the front is connected to the back by an expansible bellows, and the front can be moved back and forth relative to the back, or vice versa, but this movement is possible only within certain limits. According to the present invention, the shutter blade housing or unit may be mounted in various positions axially spaced from each other relative to the operating and control unit on which the shutter blade housing is detachably mounted, thereby increasing the range of possible variations of distance from the plane of the shutter blades to the focusing screen. Moreover, the lens elements or components are capable of being mounted in various axially spaced positions relative to the shutter blade unit, thereby increasing the range of possible positions of the lens components relative to the focusing screen.

Prior attempts have been made to secure some of these variations, by previous proposals for detachably mounting the lens units relative to some of the other parts, but there has been no previous proposal, so far as known, which produces as many possible variations in relative positions of lens elements and shutter blades, relative to each other and to the camera front wall, as is possible with the structure of the present invention.

Moreover, the present invention provides simple, inexpensive, and rugged cooperating driving parts for driving the shutter blades in the shutter housing through their opening and closing movements, by means of operating and control elements in the operating and control unit, and the invention also provides means for automatically connecting and disconnecting the driving connections with the greatest ease, merely by the act of twisting the shutter housing in place on the operating and control unit or untwisting it to remove it therefrom, regardless of whether the shutter blade housing or unit is placed in a forward position or in a reverse rearward position on the operating and control unit.

BRIEF DESCRIPTION OF THE DRAWINGS

In the accompanying drawings, which are incorporated herein by referennce and which constitute a material part of the present disclosure, illustrating a preferred embodiment of the invention by way of example:

FIG. 4 is a longitudinal section taken approximately on the line IV—IV of FIG. 3;

FIG. 5 is a fragmentary front elevation of part of the mechanism shown in FIG. 3, illustrating additional details;

FIG. 7 is a view similar to a fragment of FIG. 1, illustrating the shutter blade housing or unit in a different position, projecting rearwardly rather than forwardly from the operating and control unit.

DESCRIPTION OF THE PREFERRED EMBODIMENTS

Figure 1:
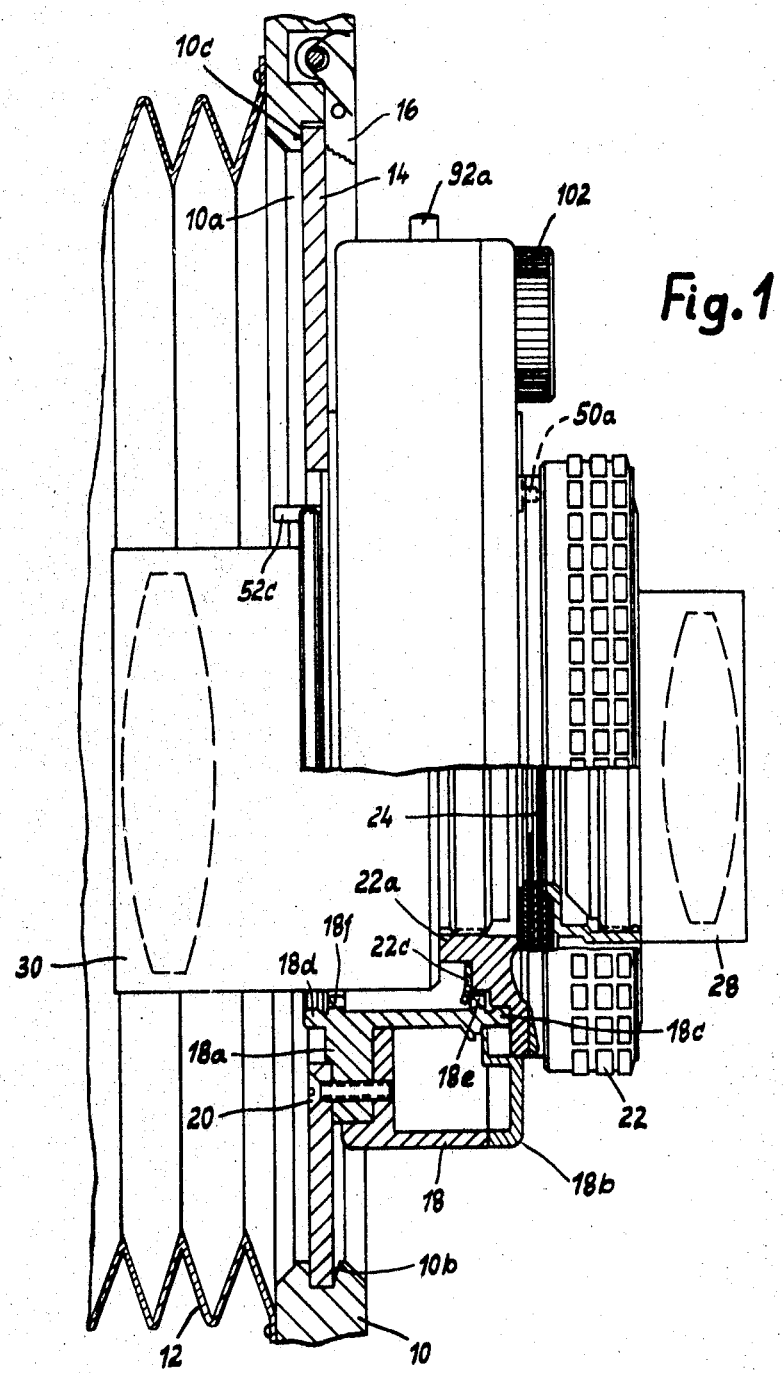
FIG. 1 is an axial view partly in side elevation and partly in vertical axial section, through the front portion of a photographic camera in accordance with the present invention, showing the operating and control unit projecting forwardly from the front wall of the camera, and the shutter blade unit or housing projecting forwardly from the operating and control unit.

As a convenient example, the invention will be described with reference to a studio camera, but it will be understood that the usefulness of the invention is not necessarily confined to a studio camera. Studio cameras are well known per se and need not be described in detail. It is sufficient for purposes of the present invention to say that the camera may have a front wall or front standard fragmentarily illustrated at 10 (often called merely a camera "front" for brevity), connected by the usual conventional expandable bellows 12 to the conventional camera back structure on which there is detachably mounted a ground glass or other suitable focusing screen, arranged to be detached and replaced by a film holder or film cassette when the focusing operation is concluded and the picture is to be taken.

The front 10 has a quadrilateral opening 10a which has at its lower side a reception groove 10b and at its upper side a supporting surface 10c. A corresponding quadrilateral supporting plate 14 is detachably mounted on the camera front by placing the lower edge of the plate 14 in the groove 10b, with the upper edge tilted forwardly, and then moving the upper edge rearwardly against the surface 10c, in which position it is removably held by a spring loaded latch or flap 16. When the latch is released, the mounting plate 14 can be tilted forwardly and then removed from the camera front 10.

Figure 2:
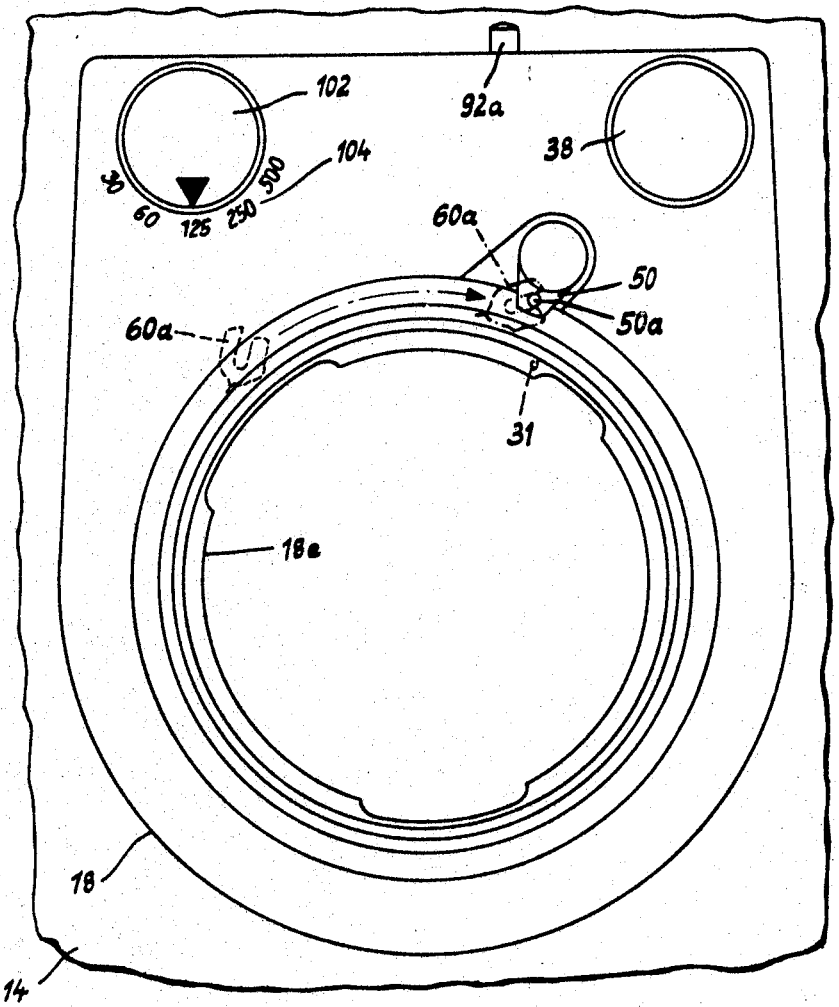
FIG. 2 is a fragmentary front elevation thereof.

An operating and control housing made of parts 18, 18a, and 18b is mounted on the plate 14. This housing (which may be referred to in general by the numeral 18 alone) is of approximately annular shape, having a large central opening alined with the optical axis of the camera. As seen in FIG. 2, the lower part of this housing is of semi-circular outline, while the upper part is of approximately rectangular outline. At its front and rear, the control housing has support flanges 18c and 18d respectively, surrounding the central opening. Associated with these flanges are bayonet connection lugs 18e and 18f respectively, constituting elements of a bayonet connection or bayonet joint of known form familiar in photographic cameras. The inner diameter of the bayonet lugs or projections 18e and 18f is somewhat greater than the outer diameter of the maximum size of lens mount which is to be used with this camera, so that a lens mount can project without obstruction through the interior of the driving and control housing or casing 18. The various parts 18, 18a, 18b, etc., are interconnected with each other by any suitable fastening means, and the complete housing or unit is fastened onto the mounting plate 14 by several screws 20 circumferentially spaced at intervals around the housing.

Figure 3:
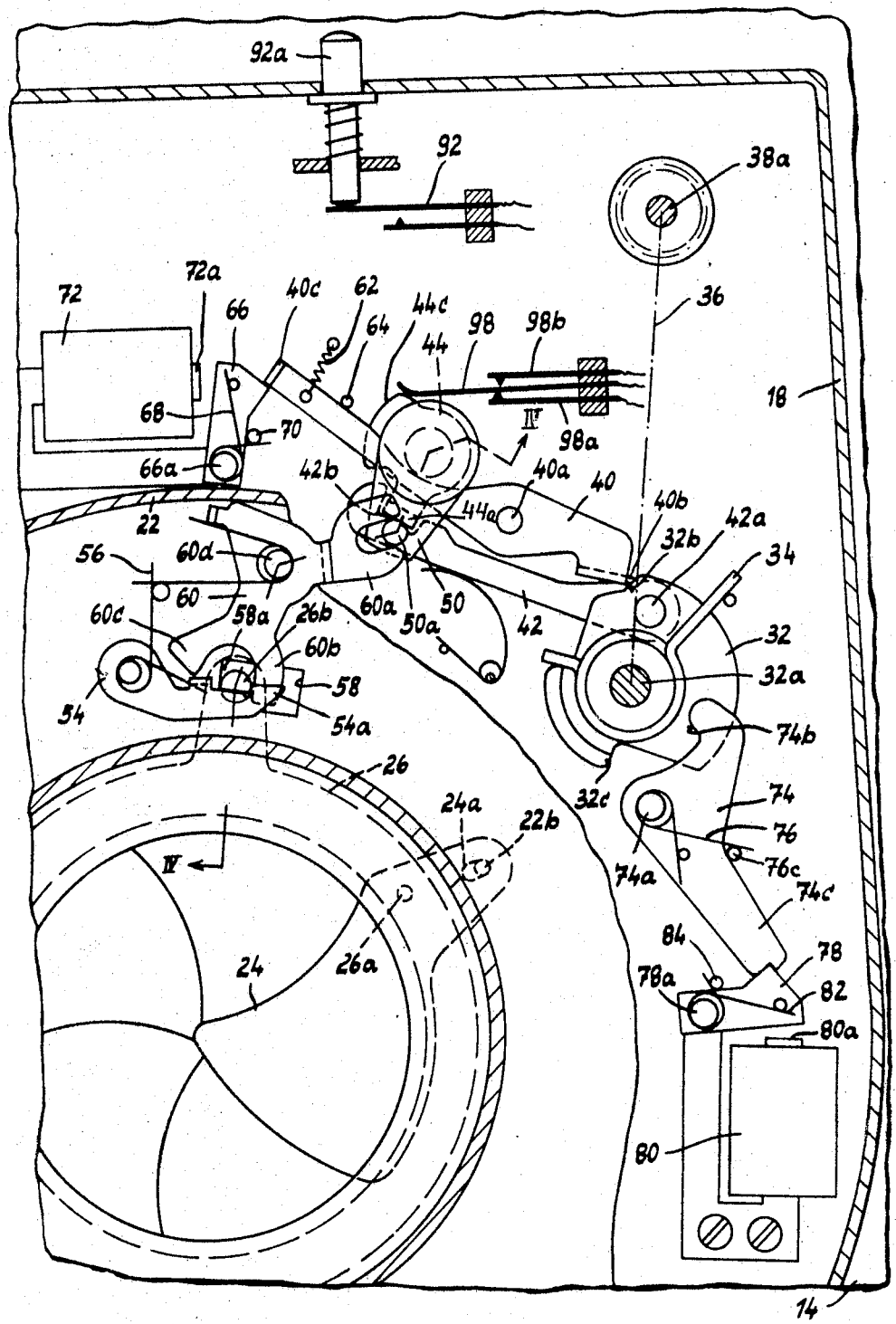
FIG. 3 is a transverse section, on a larger scale, through a fragment of the operating and control unit and the shutter blade unit.

The shutter housing unit containing the shutter blades, which may be referred to also as the shutter blade unit or the shutter blade housing or the shutter blade holder, comprises mainly two parts 22 and 22a made separately for ease of manufacture but rigidly connected to each other. Both parts 22 and 22a are of annular form with a large central opening concentric with the optical axis. A number of shutter blades 24 of conventional kind are mounted in a conventional way in this shutter housing, and are driven through their pivotal opening and closing movements by a shutter blade driving ring 26 also of conventional kind, often referred to merely as a blade ring. For example, each blade 24 may have a slot 24a (FIG. 3) engaging around a fixed pivot pin 22b in the shutter housing, and each blade engages a pin 26a on the blade ring 26. The arrangement and proportion of the parts is such that, in the conventional known manner, the blades 24 will all be swung to an open position if the blade ring 26 is moved in a clockwise direction from the position shown in FIG. 3, and will all be swung back to closed position as illustrated in FIG. 3, if the blade ring 26 moves back in a counterclockwise direction to the illustrated position.

The part 22a of the shutter blade housing carries conventional bayonet connection parts in the form of leaf springs 22c which cooperate in known fashion with the bayonet lugs 18e and 18f. If the periphery of the part 22 is grasped in the fingers and the part is placed in proper position on the front of the operating and control unit housing 18 and is twisted in a clockwise direction, the bayonet springs 22c on the unit 22 will engage behind the lugs 18e on the unit 18, and connect the units 18 and 22 to each other in the way that is very familiar in connection with bayonet joints commonly used in photographic cameras. Likewise, if the unit 22 is grasped and placed in proper position against the rear face of the unit 18 and twisted, the bayonet connection springs 22c of the unit 22 will engage behind the lugs 18f of the unit 18, and the twisting motion will mount the unit 22 on the rear of the unit 18. Thus the shutter blade unit 22 can be detachably mounted easily and quickly, by a simple twisting motion, on either the front or the rear of the operating and control unit 18.

Each of the parts 22 and 22a of the shutter blade housing or unit is provided with internal screw threads into which may be screwed a front or rear lens mount or lens holder schematically indicated at 28 or 30, respectively, containing one or more lens elements or components. Depending on the optical requirements, the lens mounts may be of various sizes. As already mentioned, the opening through the operating and control unit 18 (that is, the free space inside the bayonet lugs 18e or 18f) is relatively large, and is larger than the external size of the largest lens mount which is to be used with this camera. Thus a relatively large lens mount, such as that shown at 30, can be screwed into the rear set of screw threads on the unit 22, and can project rearwardly therefrom through the large central opening in the unit 18, as seen in FIG. 1.

The extent of rotational turning of the unit 22, when applying it to the front of the unit 18, is limited by suitable abutment means such as the abutment pin 31 shown in FIG. 2, and a similar pin (not shown) limits the turning movement when the unit 22 is applied to the rear of the unit 18 rather than to the front thereof. FIG. 1 illustrates the shutter blade unit or housing applied to the front of the unit 18, and FIG. 7 illustrates it applied to the rear of the unit 18. To apply it to the rear, it is usually most convenient to remove the mounting plate 14 from the camera (which is easily and quickly done by releasing the spring loaded latch as above explained) and then apply the shutter blade housing to the rear of the unit 18, and then replace the mounting plate 14 in the groove 10b. It will be readily understood that when the shutter blade unit is mounted on the rear of the operating and control unit 18 rather than on the front, the plane of the shutter blades 22 is in a different axial position, along the optical axis, than when it is mounted on the front, thus enabling a further variation in the axial position of the shutter blade plane, in addition to the variation obtained by expanding or contracting the bellows 12 to move the front 10 farther from or closer to the back of the camera. Likewise, by mounting the lens mount either at the front of the shutter blade housing 22 or at the rear thereof (in the position 28 or the position 30, respectively) further capabilities are provided for varying the position of the lens, as well as the position of the plane of the shutter blades, relative to the front member 10 of the camera and relative to the back or image plane thereof. As indicated earlier, this versatility of positioning the lens and the shutter blade plane, by means of mounting the elements 18, 22, 28, and 30 in various different positions relative to each other, is one of the features of the present invention.

Another feature of the present invention is the way in which the shutter blades in the shutter blade unit or housing 22 are driven from the driving and control mechanism in the housing or unit 18, and especially the way in which they are driven through connections so designed that they are automatically connected and made operative by the mere act of twisting the shutter blade unit 22 into position on either the front or the rear of the operating and control unit 18. The driving connections will now be described, referring particularly to FIGS. 3 and 4 of the drawings.

In the annular space within the operating and control unit 18 there is the main driving member (often called the master member) 32, rotatable on the pin 32a and biased in a counterclockwise direction by the main driving spring or master spring 34. Suitable tensioning mechanism of known form, indicated schematically at 36, connects the master member 32 to the shaft 38a (FIG. 3) of an externally accessible tensioning or cocking knob 38 at the upper part of the front of the operating and control unit housing 18. When the knob 38 is turned, the master member 32 is turned in a clockwise direction to tension or cock the master spring 34, from the run-down position to the tensioned position illustrated in FIG. 3. In this cocked or tensioned position it is held by a double-armed locking or latching pawl 40 mounted on the pivot 40a.

A driving link 42 is pivotally connected at one end to the master member 32 by the pivot 42a. Near the other end of the link 42 there is a notch 42b which engages a lug 44a on a transmission plate 44 fixed to a sleeve 46 which is rotatable on the fixed mounting pin 48 in the control housing 18. The sleeve 46 extends rotatably through an opening in the front wall 18b of the operating and control housing 18, and in front of the wall 18b the sleeve 46 has fixed to it a coupling plate 50 carrying a pin 50a which projects forwardly in a direction parallel to the optical axis. As further explained below, this pin 50a serves as part of the driving train or transmission train for driving the shutter blades in the unit 22, when the unit 22 is mounted on the front of the housing 18. The transmission plate 44 also has a pin 44b projecting rearwardly as seen in FIG. 4, which pin engages a slot 52a in a reversing lever 52 (FIGS. 4 and 5) which is mounted on a pin 52b and which carries another pin 52c projecting rearwardly from the reversing lever 52, through a slot in the rear wall of the housing 18 and a corresponding slot in the mounting plate 14. The construction is such that the front driving pin 50a and the rear driving pin 52c are at the same distance from the optical axis, and during the running down movement of the master member 32, these two pins will perform movements of the same angular amplitude, but in opposite directions.

Associated with the blade ring 26 within the shutter blade housing or unit 22 is a latching lever 54 (FIGS. 3 and 4) biased by a spring 56 in a counterclockwise direction, to tend to hold the nose 54a of the lever 54 in latching relation to the driving pin 26b on the blade ring 26, to hold the pin 26b against an abutment edge 58a at one end of the slot or aperture 58 in the housing. This position, when the latch 54 is effective to hold the pin 26b, is the rest position of the shutter, with the blades closed. As the blades perform their closing movement and just as the pin 26b reaches the abutment surface 58a, the nose 54a of the latch lever 54 snaps behind the pin 26b and holds the pin, to prevent rebound.

A double-armed coupling lever 60 is pivotally mounted on the pivot 60d in the shutter blade unit 22. Each of the two main arms of the double-armed coupling lever is forked. The first arm, 60a, is shaped as illustrated, so as to receive the front driving pin 50a when the shutter blade unit 22 is mounted on the front of the operating and control unit 18, and to receive the rear driving pin 52c when the shutter blade unit 52 is mounted on the rear of the unit 18. This is partially illustrated in FIG. 5, where dot-dash lines illustrate the position of the forked arm 60a in cooperation with the front driving pin 50a, and the dotted outline 60a illustrates the position of this forked arm when cooperating with the rear driving pin 52c.

The second main arm of the coupling lever 60 is forked to provide two noses 60b and 60c which coact with the driving pin 26b of the shutter blade ring 26, and with the latching lever or pawl 54, in a manner further described below.

As stated, the forked end 60a of the coupling lever 60 cooperates with either the front driving pin 50a or the rear driving pin 52c, depending upon whether the particular shutter blade unit 22 is mounted on the front or on the rear of the driving and control unit 18. The two pins 50a and 52c cannot be superimposed directly in line with each other, because of the needed space for the motion-reversing means 44b and 52, but they must be offset slightly from each other by a small angular amount, circumferentially with respect to the optical axis. Therefore it is necessary to offset the rear bayonet lugs 18f at the rear side of the control housing 18, to the same angular extent relative to the bayonet lugs 18e at the front side of the housing 18, so that the forked coupling arm 60a will always make correct functional engagement with the proper driving pin, when the shutter blade unit is engaged with the bayonet lugs and properly twisted to home position, regardless of whether it is mounted on the front or on the rear of the operating and control unit or housing 18.

The latch lever 40 (FIG. 3) has an inclined latching surface 40b in the path of a correspondingly inclined abutment face 32b of the driving member or master member 32. The angle of inclination is so chosen that there is no jamming engagement between the surfaces 40b and 32b, and so that, when the master member 32 tends to run down in a counterclockwise direction under the influence of the master spring 34, the inclination of the part 32b, cooperating with the inclined end 40b of the latching lever 40, will tend to swing the latching lever in a counterclockwise direction on its pivot 40a, if the latching lever is free to swing in this direction. A light spring 62, acting on a second arm or tail 40c of the latch 40, tends to move the latch in a clockwise direction on its pivot 40a, and to hold it against a stop pin or abutment 64, to keep the nose 40b in latching relation to the master member 32. However, the strength of the spring 62 is such that it is easily overcome by the force of the inclined portion 32b of the master member acting on the inclined portion 40b of the latch, if the latch is free to turn.

The tail 40c of the latch 40 is held, when the parts are in cocked or tension position, by a stop member or latch member 66 pivoted at 66a and acted on by a torsion spring 68 tending to move the stop member 66 against an abutment 70 and to hold it in a position where it latches the tail 40c of the main latching pawl 40, to hold the master member 32 in cocked or tensioned position. This stop member 66 acts as the armature of an electromagnet 72, and is attracted to the metallic core or pole piece 72a of the magnet 72, when the magnet is energized.

A pawl 74 in the shape of a bellcrank lever is also mounted in the control housing 18, pivoted on a fixed pin 74a. A weak torsion spring 76 biases the lever 74 in a counterclockwise direction, so as to bring a nose or striker surface 74b thereon into the path of travel of a shoulder or surface 32c on the master member 32. A pin 76c serves both as an abutment to limit motion of the lever 74 in the counterclockwise direction, and as an anchor for one end of the torsion spring 76. In the tensioned or cocked condition of the shutter, illustrated in FIG. 3, the second arm 74c of the bellcrank lever 74 engages and is held against clockwise movement by a pivoted latch 78, pivoted at 78a and serving as the armature of a second electromagnet 80 having a core or pole piece 80a which attracts the armature latch 78 when the electromagnet is energized. A weak torsion spring 82 tends to turn the armature latch 78 in a counterclockwise direction on its pivot 78a, to hold it in latching engagement with the bellcrank arm 74c. Motion of the armature latch 78 in a counterclockwise direction is limited by the stop pin 84, which serves also as an anchor or one end of the torsion spring 82.

When the parts are in the tensioned position illustrated, the surface 32c on the master member is spaced some distance angularly from the nose 74b on the bellcrank latch, so that these parts do not come into contact with each other until the master member has run down, in a counterclockwise direction, far enough to move the shutter blades 24 to fully open position. At the time the shutter blades are fully open, the part 32c on the master member engages the nose 74b and this stops further running down movement of the master member, holding the shutter blades in open position, until the bellcrank pawl can be moved aside to permit the master member to continue its counterclockwise running down movement, to close the shutter blades. The contact surface 74b is not at a right angle or normal to a line drawn from the pivot pin 74a to the contact surface 74b, but rather is at a slight angle of about 15 degrees to this right angle or normal. Thus there is no jamming engagement at the contact zone between the parts 32c and 74b, and when contact between these parts does occur during the running down movement of the master member, the pressure of the master member against the above described slightly inclined surface of the portion 74b has a camming effect tending to thrust the nose 74b aside. However, it cannot be thrust aside so long as the bellcrank lever 74 remains latched by the armature latch member 78. The contact portion 32c on the master member is preferably inclined slightly, similarly to the above described inclination of the part 74b.

Figure 6:
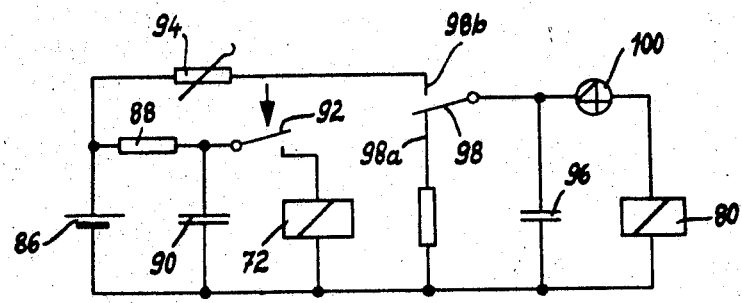
FIG. 6 is a schematic wiring diagram of the electronic part of the control mechanism.

The above mentioned electromagnets 72 and 80 are in the circuit of an electronic trip and delay arrangement, the connections of which are preferably as illustrated in the wiring diagram, FIG. 6. A battery 86 serves as a source of current, and is constantly connected through a resistor 88 to a capacitor (condenser) 90 which is thus kept charged. The charge in the capacitor 90 can be discharged through the first electromagnet 72, when a switch 92 is closed.

A shutter timing or shutter speed controlling R-C circuit (resistor-capacitor circuit) is provided. This comprises a variable resistance 94, which may be a photo resistance if the exposure time is to be determined automatically by the prevailing light conditions, or a manually settable resistance if the exposure time is to be determined manually. If it is to be determined manually, the adjustable member or slider of the variable resistance 94 is preferably operatively connected in any suitable known manner with a manually settable knob 102 on the front of the operating and control housing 18, which knob has an index mark cooperating with a shutter speed scale or exposure time scale 104 arranged on the front of the housing 18.

In addition to the variable resistance 94, the R-C timing circuit includes the capacitor 96, and the two-day switch 98 which, in one position, makes contact with a conductor member 98a leading to a resistor as illustrated and thence, through the resistor, back to one side of the battery 86; or, in the other position, makes contact with the conductor 98b which, through the variable resistance 94, goes back to the other side of the battery 86. As indicated in FIG. 3, the two-way switch member 98 is preferably in the form of a leaf spring in position to be operated by a cam portion 44c on the plate 44, the member 98 being resiliently biased to make contact normally with the member 98a as illustrated, and being so positioned that at the beginning of the running down movement of the master member, just as the plate 44 begins to turn in a clockwise direction, the cam portion 44c shifts the spring switch member 98 out of contact with the member 98a and moves it into contact with the other contact member 98b.

In addition to the parts already described, the circuit includes conductors connecting the winding of the second electromagnet 80 in parallel with the capacitor 96, through a four layer diode 100, as plainly seen in the wiring diagram, FIG. 6, and as will be readily understood by those skilled in the electronics art.

The previously mentioned switch 92 is spring biased to be normally open, and is closed by downward finger pressure on a trip button or plunger mounted at the top of the operating and control housing 18, as seen especially in FIG. 3.

The electronic control arrangement operates as follows: Let it be assumed that the camera front 10, the control unit 18, the shutter blade housing 22, and the lens mount 28 or 30, are all coupled together as illustrated in FIGS. 1–3. If the shutter operating mechanism has not already been tensioned or cocked, it is now tensioned or cocked by rotating the tensioning knob 38, thus winding up the master spring 34 and leaving the master member 32 in the tensioned position illustrated in FIG. 3. Just as the master member reaches its fully tensioned position, the end 40b of the latching pawl 40 snaps into latching position in front of the abutment surface 32b of the master member, and the armature latch 66 snaps into latching position relative to the tail 40c of the latching pawl 40, so these parts hold the master member 32 against running down. While the master member is being turned to its tensioned position, the spring 76 is able to swing the bellcrank pawl 74 counterclockwise to its obstructing position relative to the master member, and when it reaches this position, the armature latch 78 snaps behind the tail 74c of the bellcrank pawl 74, preventing the pawl from being displaced from its obstructing position. The windings of the two electromagnets 72 and 80 are not energized at this time, since the switch 92 is open and the switch 98 is in contact with the contact member 98a.

The required shutter speed or time of exposure is now selected, by subjecting the photo resistance to available light if automatically timed exposure is to be used, or by setting the variable resistance by means of a setting knob 102, if manually timed exposure is to be used. Assuming now that the focusing of the camera and any other necessary adjustments have been completed, and that the focusing screen has been replaced by film in a film cassette or film holder, the exposure can now be made. This is done by pressing down on the release plunger or trip member 92a, to close the switch 92.

As soon as the switch is closed, the capacitor 90 discharges through the winding of the electromagnet 72, thus energizing the latter and attracting its armature 66, which thereby unlatches and releases the latching pawl 40. When the latch 66 is released, the inclination of the cooperating parts 32b and 40b serves to cam the latching pawl 40 in a counterclockwise direction on its pivot 40a, overcoming the slight resistance of the light spring 62. This allows the master member 32 to start to run down in a counterclockwise direction, under the influence of the main master spring 34.

During the running down movement of the master member, the link 42 pushes on the lug 44 to turn the sleeve 46 in a clockwise direction, thereby swinging the pin 50a likewise in a clockwise direction. Since the pin is at this time engaged in the slot of the forked end 60a of the lever 60, the motion of the pin swings the lever 60 in a counterclockwise direction on its pivot 60d. The arm 60c of the lever 60 first engages a portion of the latch 54 and swings the latch 54 downwardly in a clockwise direction, releasing the nose 54a from its holding contact with the operating pin 26b of the shutter blade ring 26, and then, upon continued swinging movement of the lever 60, the same arm 60c engages the left side of the pin 26b and moves the pin rightwardly (when viewed as in FIG. 3) to swing the blade ring 26 in a clockwise direction, to open the shutter blades 24. Just about the time that the shutter blades reach fully open position, the running down motion of the master member 32 reaches the position where the abutment surface or striker surface 32c thereof encounters the surface 74b of the bellcrank latch 74, as a result of which the further running down movement of the master member 32 is temporarily stopped, so long as the armature latch 78 is in latching relation to the bellcrank latch 74 and prevents the bellcrank latch from being displaced.

Just about at the beginning of the running down movement of the master member and the consequent clockwise rotaiton of the member 44, the cam surface 44c thereon shifts the spring switch member 98 out of contact with the member 98a and into contact with the member 98b, whereby the capacitor 96 is now charged from the battery 86, through the resistor 94 which, it will be remembered, has been set in accordance with the desired shutter speed or length of exposure. After a lapse of time determined by the characteristics of the R-C circuit including the resistor 94 and capacitor 96, the charged voltage of the capacitor 96 reaches the break voltage of the four layer diode 100, so that the charge on the capacitor 96 is now able to discharge through the diode 100 and the winding of the electromagnet 80. Thus the second electromagnet 80 is energized, at a variable time after the closing of the switch 98–98b which occurs at the beginning of the running down movement, the variable time depending upon the desired length of exposure or shutter speed.

When the second electromagnet 80 is energized as above explained, it attracts its armature latch 78, which unlatches the tail 74c of the bell crank latch 74. As soon as this unlatching occurs, the force exerted by the inclined edge 32c of the master member, acting against the inclined edge 74b of the latching bellcrank, is able to swing the portion 74b aside and turn the bellcrank 74 in a clockwise direction against the slight force of the spring 76. Thus the master member 32, which was temporarily stopped by engagement with the latching bellcrank 74 so long as the bellcrank was latched by the member 78, is now able to continue its running down movement. During this second phase of the running down movement, the master member pulls rightwardly on the link 42, thereby moving the pin 50a back to its initial position, swinging the lever 60 in a clockwise direction on its pivot 60d so that the arm 60b thereof engages the right side of the pin 26b and moves this pin leftwardly to swing the blade ring 26 back in a counterclockwise direction, to close the shutter blades. When the blades reach fully closed position, the pin 26b engages the abutment 58a and the nose 54a of the latch 54 snaps behind the pin 26b and holds the blades in closed position.

It will be seen that the usual twisting on motion of the shutter blade housing 22, when applying it to the operating and control unit 18, automatically brings the forked end 60a of the lever 60 on the unit 22, into embracing cooperative relation to the driving pin 50a, when the unit 22 is placed on the front of the unit 18, as illustrated in FIG. 3. The twisting off motion, automatically disconnects the lever 60 from the driving pin 50a. To make this more clearly apparent, the forked end 60a is shown in FIG. 2 in two positions, the position shown in dotted lines being the position when the unit 22 is first placed against the front of the housing 18, before the twisting on occurs, and the position shown in dot-dash lines being the final position of the forked end at the conclusion of the twisting on motion, at which time the forked end is seen to be in proper embracing relation to the drive pin 50a. The terms twisting on and twisting off refer to the familiar twisting motion, concentrically about the optical axis, which occur when parts are connected together by means of the familiar bayonet connection, or when they are disconnected from each other by a reverse motion. Similarly, when the unit 22 is applied to the rear of the housing 18 rather than the front, the twisting on motion will bring the same forked end 60a into cooperative relation to the second drive pin 52c, as shown in dotted lines in FIG. 5, and the twisting off motion will disconnect it from the pin 52c.

It will now be seen that a construction of great versatility has been provided, in a manner which is both economical and rugged, and which fulfills the conditions and requirements above mentioned as being desirable. As a result, the field of use is greatly amplified. Various different interchangeable shutter blade housings 22 can be used with the same operating and control unit 18, and each of these shutter blade housings can be mounted either on the front or on the rear of the operating and control unit. If desired, the lens elements or components can be permanently mounted directly in the shutter blade housing 22, or if preferred, separate lens elements in separate mounts 28 and 30 can be used. For making a quick change of lens characteristics, the shutter blade unit 22 (which may also be referred to as an objective unit) can be quickly removed from the camera by untwisting the bayonet connection, and can be quickly replaced by a different shutter blade unit 22 with different lens characteristics, regardless of whether the lens elements are permanently built into the unit 22 or whether they are in separate mounts 28 or 30 or both, detachable from the unit 22. When removing and replacing the unit 22, it is not necessary to detach the lens mounts 28 and 30, if the lenses are in these separate mounts. These lens mounts can remain screwed into the shutter blade unit 22, during attachment or removal from the housing 18.

Thus, in order to use a plurality of different shutter blade units with lenses mounted therein or carried thereby, simple and inexpensive units can be employed, without duplicating in each unit the expense of the driving and control mechanism, which is included in the housing 18 and which is usable with any shutter blade unit that may be attached to the housing 18.

In most cases, any desired variations will be obtainable merely by taking off the unit 22 and replacing it with another unit 22 with different characteristics. However, in some special cases the entire housing 18 may be removed from the camera and replaced by another housing 18 with different characteristics. Or again, the housing 18, normally mounted on the front of the mounting plate 14, may be changed to project rearwardly rather than forwardly, either by taking out the screws 20 and actually shifting the housing 18 to the other side of the plate 14, or preferably by merely removing the mounting plate 14 temporarily from the camera front 10, and replacing it in a reverse position. In either case, if it is contemplated that the housing 18 is to be used in a position projecting rearwardly rather than forwardly from the plate 14, duplicate controls 38, 92a, and 102 are provided on what is the rear of the housing 108 when the housing is in the normal position illustrated in FIG. 1, so that these controls will be accessible when the housing is reversed to project rearwardly.

It will be observed that the operating and control unit 18 is provided with what may be called a driving member or coupling member (50a or 52c) which projects from the housing unit or element 18, and which cooperates with what may be called a driven member or cooperating coupling member 60 which is mounted on and projects from the shutter blade unit or objective unit 22.

It is to be understood that the foregoing disclosures are given by way of illustrative example only, rather than by way of limitation, and that without departing from the invention, the details may be varied within the scope of the appended claims.

What is claimed is:

1. A photographic camera comprising a control housing having shutter driving and timing mechanism therein and two driving members, one externally accessible adjacent a front face of said control housing and the other accessible adjacent a rear face thereof, an objective housing having shutter blades therein and a driven member externally accessible on said objective housing, said driven member being operatively connected to said shutter blades to cause opening and closing movements thereof as a result of predetermined movements of said driven member, and detachable coupling means for detachably coupling said objective housing to said control housing in an operative position wherein said driven member is in position to be driven by movement of one of said driving members.

2. A construction as defined in claim 1, wherein said detachable coupling means is so formed that said objective housing may be coupled selectively on either the front face or the rear face of said control housing, to cause said driven member to cooperate respectively with the driving member adjacent the front face of the control housing or the driving member adjacent the rear face thereof.

3. A construction as defined in claim 2, wherein said mechanism within said control housing moves said two driving members simultaneously through equal distances in opposite directions.

4. A construction as defined in claim 3, wherein each of said driving members includes a pin extending in a direction parallel to each other and to an optical axis extending centrally through said objective housing, and said driven member includes a lever having a forked end adapted to embrace one or the other of said pins, depending upon whether said objective housing is applied to the front face or the rear face of said control housing.

5. A construction as defined in claim 1, wherein said driving member includes a pin extending in a direction parallel to an optical axis passing centrally through said housings when they are coupled to each other, and said driven member includes a lever having a forked end adapted to embrace said pin.

6. A construction as defined in claim 5, wherein said objective housing contains a shutter blade operating ring having an operating pin thereon, and wherein said lever has a second forked end for engaging and moving said operating pin.

7. A construction as defined in claim 1, wherein said objective housing has internally screw threaded portions at front and rear, into which a lens mount may be screwed.

8. A construction as defined in claim 7, wherein said control housing has an axial opening therethrough of larger diameter than the external diameter of the largest lens mount to be screwed into said objective housing, so that such lens mount may project through said axial opening.

9. A construction as defined in claim 1, wherein said camera includes a front wall, and wherein said control housing is removably and replaceably mounted on said front wall.

10. A photographic camera comprising a front wall, a separate control housing having shutter driving and timing mechanism therein and two driving members, one of said driving members being located adjacent a front face of said control housing and the other being located adjacent a rear face thereof, a separate objective housing having shutter blades and a driven member operatively connected to said shutter blades to cause opening and closing movements thereof from predetermined movements of said driven member, detachable connecting means for connecting said control housing to said front wall in either one of two operative positions in one of which said control housing lies in front of said front wall and in the other of which said control housing lies behind said front wall, and detachable coupling means for detachably coupling said objective housing to said control housing in an operative position in which said driven member of said objective housing is driven by one of said driving members of said control housing.

11. A construction as defined in claim 10, wherein said control housing comprises a mounting member (14) having a front face and a rear face, and said camera includes clamping means (16) for holding said mounting member with either its front face or its rear face seated against said camera front wall (10).

12. A photographic camera construction comprising:
 (a) a camera body having a front wall and an optical axis;
 (b) a separate control housing having shutter driving and timing mechanism therein;
 (c) a separate objective housing having shutter blades;
 (d) means for selectively mounting said control housing on said front wall in a first operative position projecting forwardly from said front wall or in a second operative position projecting rearwardly from said front wall, said two operative positions being spaced from each other along said optical axis;
 (e) means for detachably and selectively mounting said objective housing on said control housing in a first operative position projecting forwardly from said control housing when said control housing is in either one of its two operative positions or in a second operative position projecting rearwardly from said control housing when said control housing is in either one of its two operative positions; and
 (f) interengaging operating connections on said control housing and said objective housing, respectively, for operating said shutter blades of said objective housing from movement of said driving mechanism in said control housing when said objective housing is mounted in either one of its operative positions on said control housing regardless of which operative position said control housing occupies with respect to said front wall;
 (g) whereby said objective housing may be selectively mounted in any one of four different operative positions axially spaced from each other along said optical axis, depending upon which of its two positions said objective housing occupies with respect to said control housing and which of its two positions said control housing occupies with respect to said front wall.

References Cited
UNITED STATES PATENTS

| | | | |
|---|---|---|---|
| 547,855 | 10/1895 | Lee | 355—55 |
| 1,895,654 | 1/1933 | Forrest | 355—55 |
| 2,472,586 | 6/1949 | Harvey | 95—53 |
| 2,900,885 | 8/1959 | Gebele | 95—53 |

FOREIGN PATENTS 921,665  12/1954  Germany.

NORTON ANSHER, Primary Examiner

L. H. McCORMICK, JR., Assistant Examiner

UNITED STATES PATENT OFFICE
CERTIFICATE OF CORRECTION

Patent No. 3,521,543           Dated July 21, 1970

Inventor(s) Franz Singer

It is certified that error appears in the above-identified patent and that said Letters Patent are hereby corrected as shown below:

In the heading to the printed specification, after line 7, insert -- Claims priority, application Germany, July 27, 1966, C 39,732 --.

Signed and sealed this 4th day of May 1971.

(SEAL)
Attest:

EDWARD M. FLETCHER, JR.
Attesting Officer

WILLIAM E. SCHUYLER, JR.
Commissioner of Patents